Oct. 8, 1957  J. STUART III  2,808,891
VARIABLE PITCH PROPELLER CONTROL MECHANISM
Original Filed Dec. 3, 1945  6 Sheets-Sheet 1
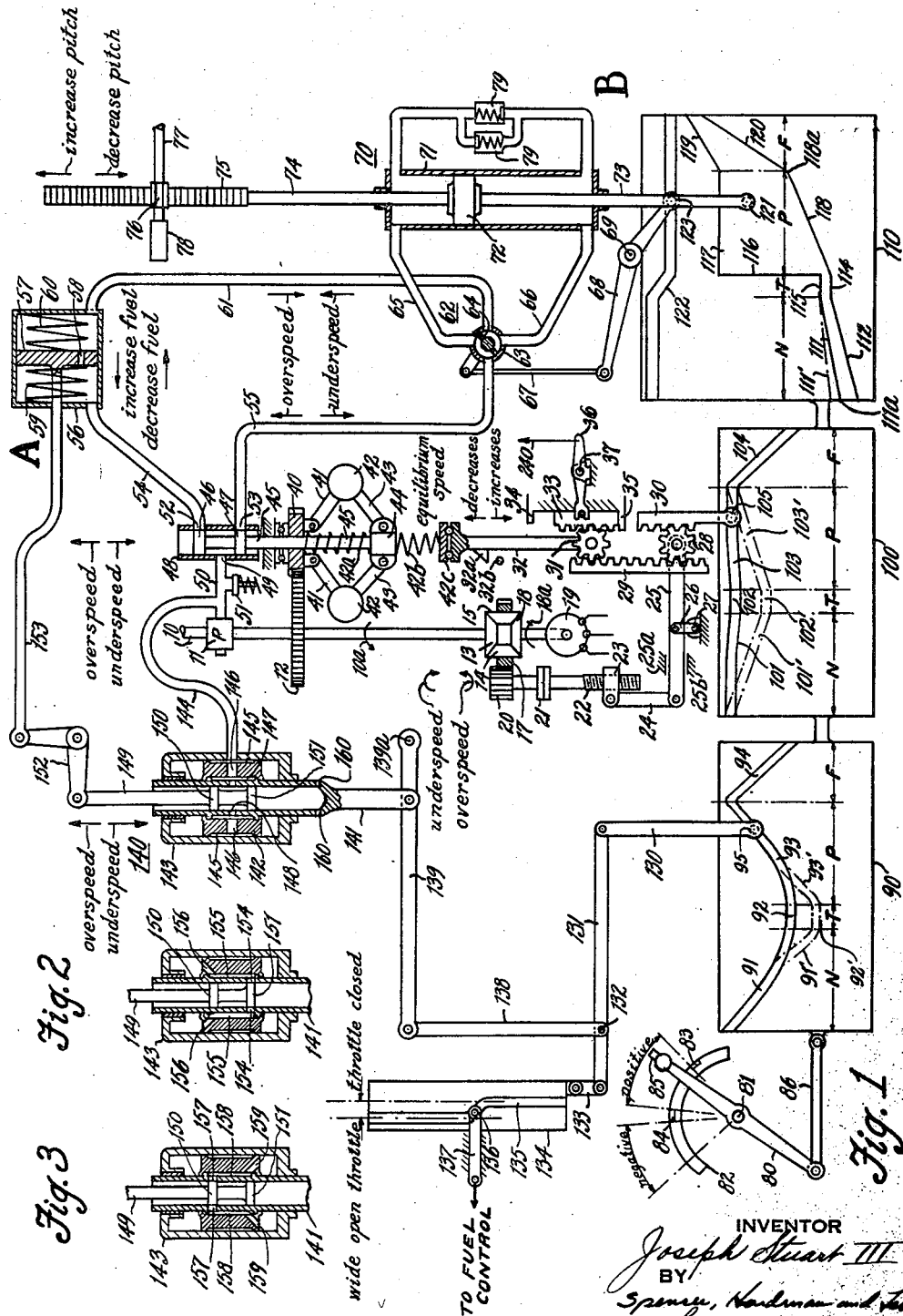
INVENTOR
Joseph Stuart III
BY
Spencer, Hardman and Feter
his ATTORNEYS Oct. 8, 1957  J. STUART III  2,808,891
VARIABLE PITCH PROPELLER CONTROL MECHANISM
Original Filed Dec. 3, 1945  6 Sheets-Sheet 2
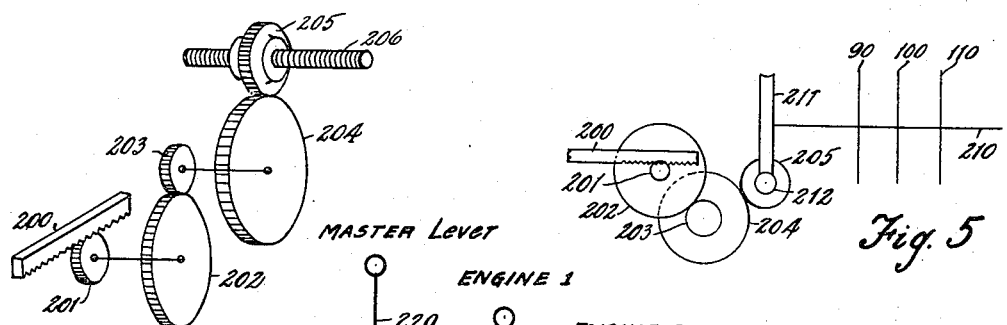
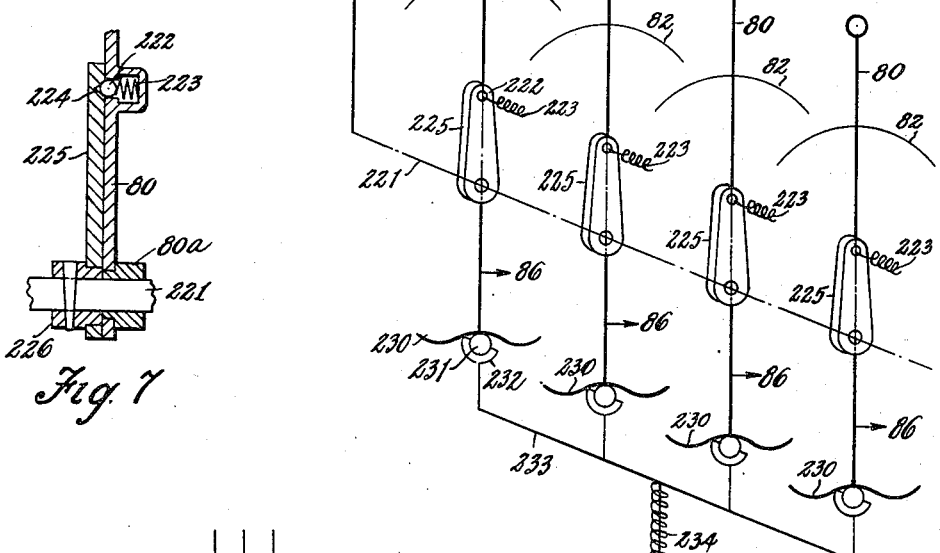
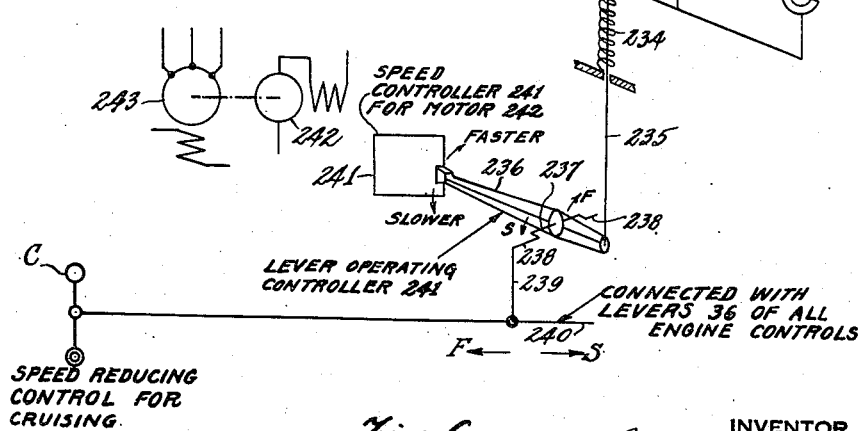
INVENTOR
Joseph Stuart III
BY
Spencer, Hardman and Fehr
his ATTORNEYS

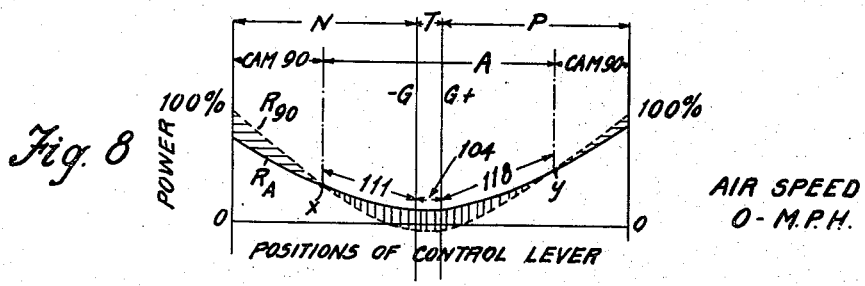
Fig. 8 — AIR SPEED 0-M.P.H.
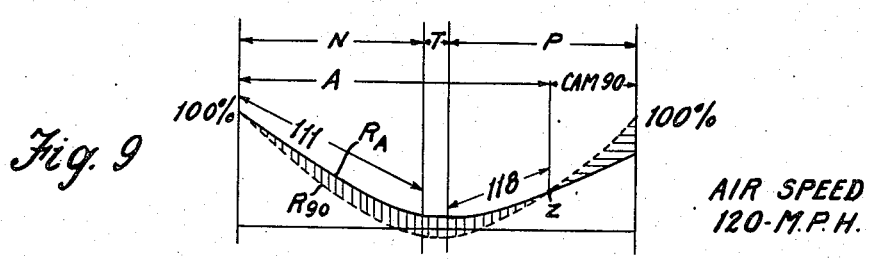
Fig. 9 — AIR SPEED 120-M.P.H.
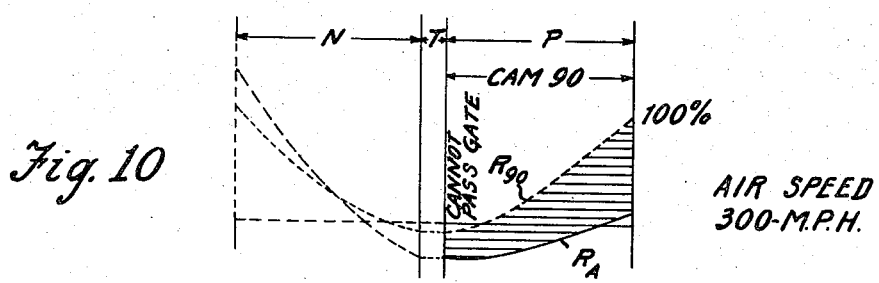
Fig. 10 — AIR SPEED 300-M.P.H.
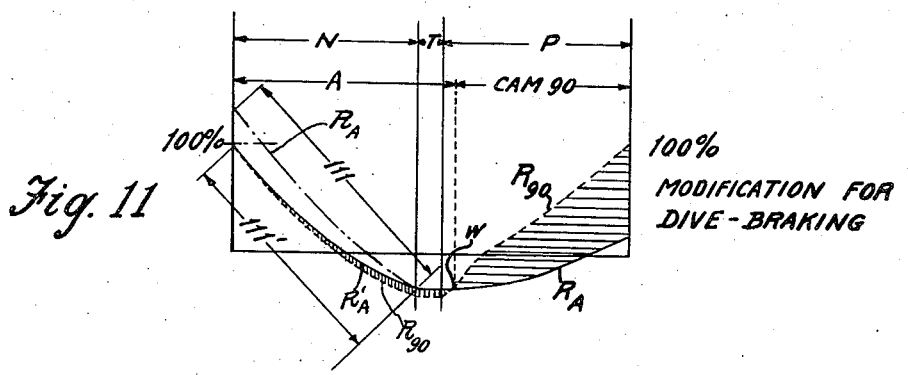
Fig. 11 — MODIFICATION FOR DIVE-BRAKING

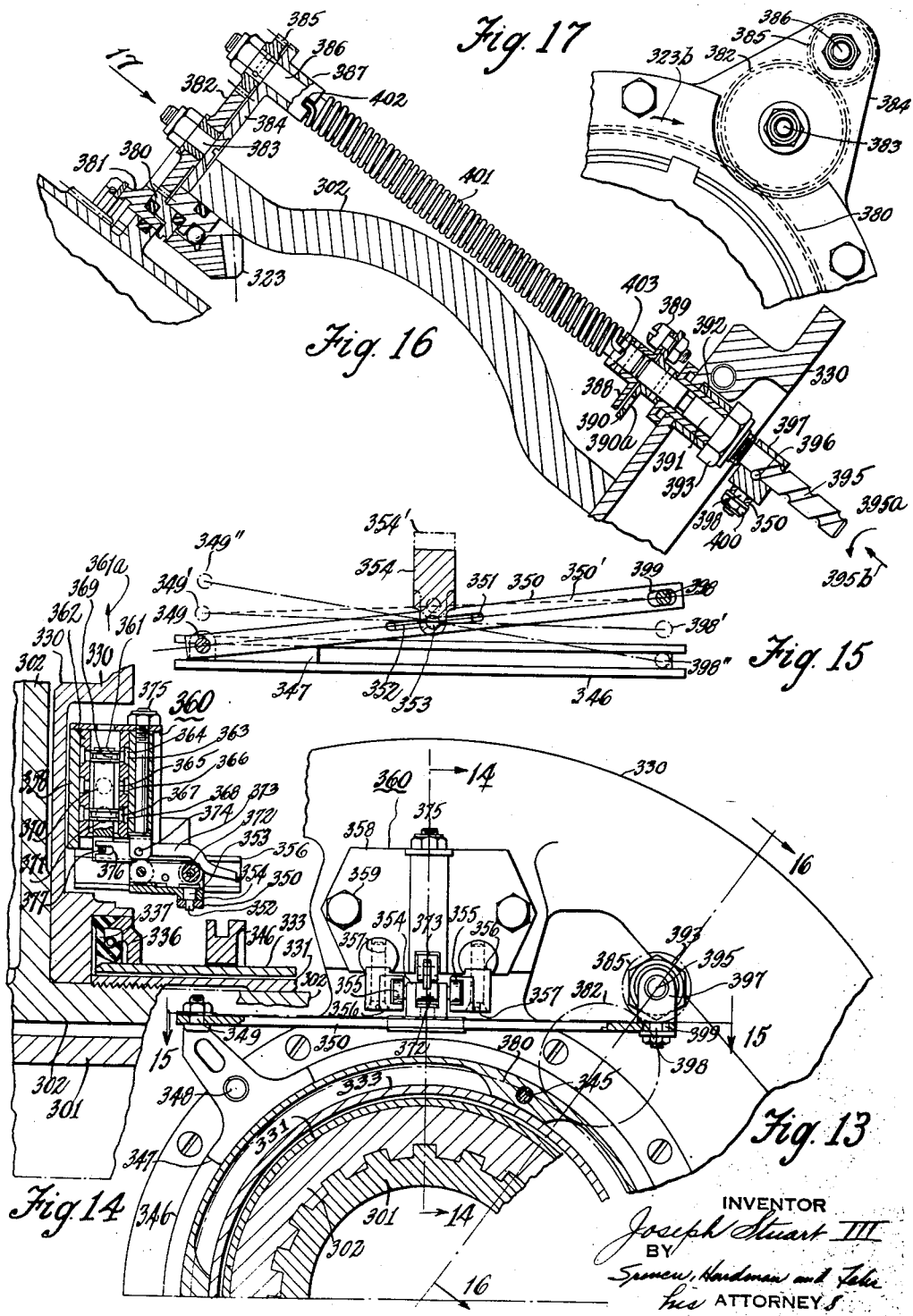

Oct. 8, 1957 J. STUART III 2,808,891
VARIABLE PITCH PROPELLER CONTROL MECHANISM
Original Filed Dec. 3, 1945 6 Sheets-Sheet 6

INVENTOR
Joseph Stuart III
BY
Spencer, Hardman and Fehr
his ATTORNEYS

United States Patent Office 2,808,891
Patented Oct. 8, 1957

2,808,891

VARIABLE PITCH PROPELLER CONTROL MECHANISM

Joseph Stuart III, Dayton, Ohio, assignor to General Motors Corporation, Detroit, Mich., a corporation of Delaware Original application December 3, 1945, Serial No. 632,566, now Patent No. 2,664,959, dated January 5, 1954. Divided and this application October 23, 1953, Serial No. 393,165

8 Claims. (Cl. 170—160.17)

This invention relates to the control of the speed of a prime-mover propeller power plant particularly for use in airplanes.

This application is a division of my copending application Serial No. 632,566, filed December 3, 1945, now U. S. Patent 2,664,959.

One of my objects is to prevent shift from the positive range of control to the negative range of control at excessive forward speeds when the propeller would windmill the prime-mover excessively.

Another object is to provide manual control of propeller blade angles in the low blade angle range where governed control is not satisfactory.

Another object is to provide control apparatus having a single manually operated main control member for the negative thrust range, for the positive thrust range and for feathering.

Further objects and advantages of the present invention will be apparent from the following description, reference being had to the accompanying drawings, wherein a preferred embodiment of the present invention is clearly shown.

In the drawings:

Fig. 1 is a diagram of the present control system.

Figs. 2 and 3 are longitudinal sectional views in different planes of the servo-motor 140 of Fig. 1.

Figs. 4 and 5 are diagrams of optional gear trains to be used with apparatus shown in Fig. 1.

Fig. 6 is a diagram of apparatus for plural engine control.

Fig. 7 is a sectional view on line 7—7 of Fig. 6.

Figs. 8 through 11 are charts showing the operation of the control system under various conditions.

Fig. 13 is a fragmentary sectional view taken approximately on line 13—13 of Fig. 12.

Figs. 14, 15, and 16 are fragmentary sectional views taken respectively on lines 14—14, 15—15, and 16—16 of Fig. 13.

Fig. 17 is a fragmentary view in the direction of arrow 17 of Fig. 16.

Figure 18:
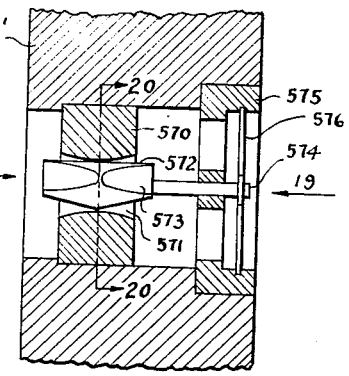

Fig. 18 is a fragmentary longitudinal sectional view showing a modified form of piston of Fig. 1 equipped with automatic orifice control.

Figure 19:
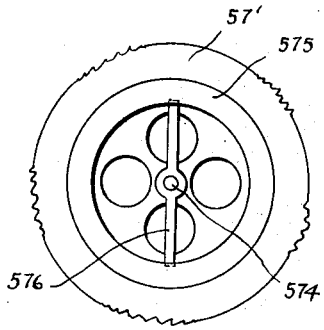

Fig. 19 is a view in the direction of arrow 19 of Fig. 18.

Figure 20:
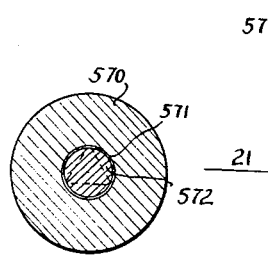

Fig. 20 is a sectional view on line 20—20 of Fig. 18.

Figure 21:
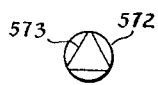

Fig. 21 is a view in the direction of arrow 21 of Fig. 18.

Referring to Fig. 1, a shaft 10 driven by the engine shaft drives an oil pump 11, a gear 12 and a bevel gear 13 meshing with bevel gears 14 and 15 supported by a gear 17 and meshing with a gear 18 driven by a three-phase synchronous motor 19 operated by a master generator (to be described) which is driven by an electric motor at a predetermined speed for the purpose of synchronizing or equalizing the governed speeds of the engines of the multi-engine airplanes. So long as the speed of gears 13 and 18 are equal and opposite there will be no rotation of gear 17, but this gear will rotate in one direction or the other, depending on the difference in the speeds of gears 18 and 13. Gear 17 meshes with gear 20 connected by a friction clutch 21 with a screw 22 engaged by a nut 23, connected by a link 24 with a lever 25 movable between limit stops 25a and 25b and pivotally supported by a link 26 pivoted at 27. Lever 25 carries a pinion 28 meshing with racks 29 and 30. Rack 29 is engaged by pinion 31 pivotally supported by rod 32 and meshing with a rack 33 actuated between stops 34 and 35 by a lever 36 pivoted at 37.

The gear 12 meshes with a gear 40 connected by links 41 with fly-weights 42 connected by links 43 with a collar 44 attached to a valve stem 45 providing lands 46 and 47 slidable within a guide 48 having an inlet port 49 connected with the pump outlet 50 having a pressure relief valve 51. Guide 48 has ports 52 and 53 connected respectively with pipes 54 and 55. Pipe 54 is connected with a cylinder 56 receiving a piston 57 having an orifice 58 and balanced between springs 59 and 60. Cylinder 56 is connected with pipe 61. Pipes 55 and 61 are connected with the body 63 of a switch-over valve 62 having a movable valve member 64 for connecting pipes 55 and 61 respectively with pipes 65 and 66, or vice versa. Valve member 64 is actuated by a link 67 connected with a lever 68 pivoted at 69.

Pipes 65 and 66 are connected with cylinder 71 of a servo motor 70 having a piston 72 connected with rods 73 and 74. Rod 74 is connected with a rack 75 meshing with a gear 76 which operates shaft 77 connected with a blade pitch control unit to be described. Shaft 77 operates an instrument 78 known as a "selsyn" for transmitting to the instrument board an indication of blade pitch. Relief valves 79 limit the oil pressures exerted on piston 72. These valves open at such low pressure that flow-rate is not appreciably curtailed although the piston 72 is at the end of its travel. Blade angle may be controlled manually although pressure may be applied to the piston 72. This will be described later.

Centrifugal force acting on weights 42 is opposed by spring 42a and assisted by spring 42b. The compression of the spring 42b is adjusted by movements of rod 32 transmitted through a thrust bearing 42c to the spring 42b.

A main control lever 80 pivoted at 81 moves along a quadrant sector 82 having a feathering stop 83 and a transition stop 84 engaged by a plunger (not shown) carried by the lever 80. By pressing a button 85, the plunger is retracted so that the lever 80 may move clockwise past the stop 83 into feather controlling position or counterclockwise past the stop 84 into negative thrust controlling position. Stops 83 and 84 normally confine the movement of lever 80 to positive thrust controlling position. Lever 80 is connected by link 86 with three cam plates, namely, throttle setting cam plate 90, speed setting cam plate 100 and a cam plate 110 having means for limiting blade angle and having a cam for controlling a switch-over valve 62.

Plate 90 provides a cam groove having a portion 91 coordinating throttle setting with negative pitch control, a portion 92 for transition between negative pitch control and positive pitch control, a portion 93 for coordinating throttle setting with positive pitch control and a portion 94 for coordinating throttle setting with feathering control. This cam groove receives a roller 95.

Plate 100 provides a cam groove having a portion 101 controlling speed for negative pitch, a transition groove 102, a portion 103 for controlling speed for positive pitch and a portion 104 controlling speed for feathering. Portions 101, 102 and 103 are for turbine control. Portions 101', 102', and 103' are for reciprocating engine control. This cam groove receives a roller 105 carried by the rack 30.

The cam plate 110 provides a cam groove of varying width bounded on the upper side by the walls 111, 115, 116, 117 and 119, and on the lower side by walls 112, 114, 118 and 120. This irregular cam groove receives a roller 121 supported by rod 73. The portion bounded by walls 111, and 112 provides the blade angle limiting portion for negative pitch control. The portion bounded by walls 114 and 115 is a transition gate for receiving roller 121 when conditions are proper for change between positive and negative pitch control or vice versa. The portion bounded by walls 116, 117 and 118 provides the portion for limiting the blade angle for positive pitch control. The portion bounded by walls 119 and 120 limits the blade angle for feathering.

The plate 110 provides a cam groove 122 receiving a roller 123 on lever 68. When shifting into negative pitch control, cam 122 raises roller 123 and causes valve 62 to reverse the connections with cylinder 71.

The roller 95 which is received in the cam groove of plate 90 is carried by a rod 130 attached to a lever 131 having a floating fulcrum 132 and connected by a link 133 with a plate 134 having a throttle actuating cam groove 135 for receiving a roller 136 mounted on a rod 137 connected in any suitable manner with the throttle mechanism of the prime-mover, either the throttle valve of a carburetor reciprocating engine or the fuel flow control valve of a fuel injection reciprocating engine or a gas turbine.

The floating fulcrum 132 of lever 131 is supported by a link 138 connected with a lever 139 pivoted at 139a. Lever 139 is connected with the piston rod 141 of a servo-motor 140. Rod 141 is attached to a piston 142 movable in the axially fixed cylinder 143. The pressure fluid for moving the piston in either direction enters the side of cylinder 143 through a pipe 144 connected with pump outlet 50. Pipe 144 communicates with an annular groove 145 provided by the piston 142. Groove 145 is connected by passages 146 with diametrically opposite grooves 147 provided by the piston rod 141. Grooves 147 are connected by diametrically opposite holes 148 with the interior of the rod 141. Rod 141 receives a valve 149 having lands 150 and 151 and connected by bell-crank 152 and link 153 with the piston 57 within the cylinder 56. Referring to Fig. 2 which is a longitudinal sectional view of the servo-motor 140 in a plane 120° from the plane of the sectional view shown in Fig. 1, the land 151 controls diametrically opposite ports 154 connected with diametrically opposite grooves 155 of the rod 141; and grooves 155 are connected by holes 156 with the upper end of the cylinder 143 as viewed in Fig. 2. Referring to Fig. 3, which shows a longitudinal sectional view taken in a plane 120° with respect to the planes of the longitudinal sectional views of Figs. 1 and 2, the land 150 controls ports 157 connected with diametrically opposite grooves 158 of the rod 141 and grooves 158 are connected by holes 159 with the lower end of the cylinder 143.

As the valve 149 moves, the piston 142 follows the valve. For example, if valve 149 moves down the ports 154 are uncovered, and pressure fluid is admitted to the upper end of cylinder 143 to cause piston 142 to move down the distance that valve 149 had moved down. Fluid in the lower end of the cylinder escapes through holes 159, grooves 158, ports 157 and the upper end of rod 141. If valve 149 moves up, ports 157 are uncovered, and pressure fluid is admitted to the lower end of cylinder 143 to cause piston 142 to move up the distance that valve 149 had moved up. Fluid in the upper end of cylinder 143 escapes through holes 156, grooves 155, ports 154 and holes 160 in the rod 141.

The pressure fluid which is discharged from the rod 141 is received by suitable chambers, not shown, which enclose the servo-motor 140, the pressure fluid being returned to the intake of the pressure pump 11. The discharge from the valve sleeve 48 is likewise received by a reservoir enclosing the pump 11.

The valve 149 is actuated by the piston 57 in the cylinder 56. The piston 57 moves right when oil flows from the pipe 54 through the cylinder 56 and into the pipe 61; and piston rod 141 and cam 134 move up and rod 137 moves right to close the fuel valve or throttle. Piston 57 moves left when this flow is reversed; and the cam 134 moves down to open the fuel throttle. If the total oil pressure acting upon the piston 57 were sufficient to operate the engine throttle through the cam plate 134, the servo-motor unit 140 could be omitted and the piston 57 would be directly connected with the lever arm 139.

An explanation of the various legends appearing on Fig. 1 will now be made. The negative, transition, positive and feathering portions of the cam grooves of plates 90, 100 and 110 are respectively indicated by the double arrow lines marked respectively N, T, P and F. The positive range of the main control lever 80 is indicated by the double arrow arc marked "Positive." The negative range of the main control lever 80 is indicated by the double arrow arc marked "Negative." The extreme positions of the roller 136 within the throttle actuating cam groove 135 are indicated respectively by vertical dot-dash lines marked "Throttle closed" and "Wide open throttle." The movement of the piston rod 141 of the servo-motor 140 to correct an over-speed is indicated by the arrow marked "Over-speed." The movement of rod 141 to correct for under-speed is indicated by the arrow marked "Under-speed." The movement of valve rod 45 to correct over-speed is up, as indicated by the arrow marked "Over-speed." The movement of valve rod 45 to correct under-speed is down, as indicated by the arrow marked "Under-speed." Adjacent the rod 32 are two arrows marked respectively "decreases" and "increases" indicating, respectively, the movement for equilibrium speed decrease or increase. The direction of rotation of the shaft 10 is indicated by arrow 10a. The direction of rotation of gear 18 is indicated by arrow 18a. Looking down upon the gear 20 the direction of rotation to correct over-speed relative to the master is counterclockwise, as indicated by the arrow marked "overspeed"; and, to correct for under-speed, the direction of rotation of gear 20 is clockwise, as indicated by the arrow marked "underspeed." The flow of pressure oil through the pipes 55 and 61 to correct over-speed is indicated by the adjacent arrows marked "overspeed;" and the direction of flow to correct under-speed is indicated by the adjacent arrows marked "under-speed." The direction of movement of rack 75 to obtain increased pitch or decreased pitch are indicated by arrows respectively marked by appropriate legends.

The downward movement of rod 32 for the purpose of increasing equilibrium speed is limited by lug 32a which engages a stop 32b, to prevent any unsafe maximum speed being called for.

In order to understand the function of the control apparatus with respect to stability of governing action, reference is made to the fundamental equation of the power plant and controller combination which is:

$$J\ddot{\phi} + \frac{\partial Q_1}{\partial \dot{\phi}} \cdot \dot{\phi} + \frac{\partial Q_2}{\partial \beta} \cdot \beta = 0$$

$J$ = polar moment of inertia of all rotating parts referred to the propeller shaft axis.
$\phi$ = angular displacement (radians) of the rotating mass relative to a reference rotating at constant speed.
$\dot{\phi}$ or $\frac{\partial \phi}{\partial t}$ = velocity of displacement (radians/sec.).
$\ddot{\phi}$ or $\frac{\partial^2 \phi}{\partial t^2}$ = acceleration of displacement (radians/sec.²).
$Q_1$ = torque due to off-speed.
$\frac{\partial Q_1}{\partial \dot{\phi}} = \frac{\text{increment of torque due to off-speed}}{\text{increment of velocity of displacement}}$
$\beta$ = blade angle change.
$Q_2$ = torque due to blade angle change.
$\frac{\partial Q_2}{\partial \beta} = \frac{\text{increment of torque due to blade angle change}}{\text{increment of blade angle change}}$ Torque I due to acceleration = $J\ddot{\phi}$.

Torque II due to speed error = $\frac{\partial Q_1}{\partial \dot{\phi}} \times \dot{\phi}$ Torque III due to blade angle change = $\frac{\partial Q_2}{\partial \beta} \times \beta$ Displacement of stem 45 is proportional to the speed error or $\dot{\phi}$. Rate of oil flow to servo-motor 70 is proportional to $\dot{\phi}$. As rate of pitch change is directly determined by the oil flow rate, it follows that $\dot{\beta}$ is proportional to $\dot{\phi}$. $\dot{\beta} = K\dot{\phi}$ or, integrating, $\beta = K\phi$, $K$ being the proportionalizing rate of the governor.

Therefore torque III = $\frac{\partial Q_2}{\partial \beta} \cdot K\phi$

The algebraic sum of torques I, II and III is zero in free motion of the system.

$$J\ddot{\phi} + \frac{\partial Q_1}{\partial \dot{\phi}} \cdot \dot{\phi} + \frac{\partial Q_2}{\partial \beta} \cdot K\phi = 0$$

The only variable is $\phi$.
Torque I varies with acceleration of $\phi$, $(\ddot{\phi})$.
Torque II varies with velocity of $\phi$, $(\dot{\phi})$.
Torque III varies with amount of $\phi$, $(\phi)$.

Torque II represents the sum of the effect of aerodynamic damping and of throttle control by piston 57 (Fig. 1). Piston 57 effects a throttle control in response to velocity of flow of pressure oil entering or leaving cylinder 71. It is responsive to $\dot{\phi}$, velocity of displacement; and as engine torque is a function of throttle setting, a correcting torque proportional to off-speed, $\dot{\phi}$, results.

Torque III represents the function of piston 72 (Fig. 1) which changes blade angle in proportion to $\phi$, the amount of displacement.

This means that the fly-weights 42 in responding to an increase or decrease in speed, actuates the valve member 45 in proportion to off-speed. In so moving the valve directs flow of fluid from the source 11 in proportion to off-speed, or in proportion to speed error. The flow from valve 45 is directed either by 54 to cylinder 56 and then by 61 to cylinder 71 where it displaces piston 72 in proportion to speed error, or it is directed by 55 to cylinder 71 where it also displaces piston 72 in proportion to speed error. Thus the rate of fluid flow to the cylinder 71 is proportional to speed error, and the total flow of fluid to the cylinder 71 during off speed will be the summation of all flow due to speed error, were it not for the relief valves 79 capable of passing fluid around the cylinder 71 when manual control of the blade angle overrides the governor control. The complete circuit of fluid flow to and from the cylinder 71 passes through the cylinder 56 by means of the orifice 58, but the orifice 58 does not alter the amount of flow to the cylinder 71. However the rate of flow of fluid through the piston 57 by way of the orifice 58 modifies the rate of movement of the piston 57. Discharge through the orifice is somewhat limited, being less than that capable through either passage 54 or 61, any movement of the piston 57 is resisted by one or the other of the springs 59 or 60, and flow into either end of the cylinder 56, builds up pressure, first resisted only by the restricted orifice 58 and then the opposing one of the springs. High rates of flow to the cylinder 56 build up greater pressures than do low rates of flow, wherefore movement of the piston 57 will vary with the rate of fluid flow and the speed error. While equal unit volumes of fluid may pass through the distributing port of the valve 45 will in general effect equal movements of the piston 72, the displacement of the piston 57 may be otherwise, due to the rate of flow of those unit volumes, hence there is response to integrated speed error.

Stability of governing action is effected because, while piston 72 is operating to govern the engine by changing blade angle in proportion to $\phi$ to give a "spring" action, piston 57 is operating to give adequate damping of the system by changing the fuel rate (torque) in response to $\dot{\phi}$. While refinements of this nature have not been necessary with the conventional reciprocating engine propeller combination, equally adequate system response in the case of systems using internal combustion turbines having greatly increased effective inertia referred to the propeller shaft axis requires increased rate of pitch change and vastly increased damping which can most readily be effected through the fuel control of the turbine as indicated in the foregoing. These refinements are particularly necessary in the case of the turbine because of much greater susceptibility to damage by overspeeding. The damping by means of the fuel rate control positively and immediately prevents any serious overspeeding. The equivalent of this action cannot be obtained by devices acting upon propeller pitch unless impractically high rates of pitch changes are available to counteract sudden changes in fuel control settings by the pilot. To keep the maximum overspeed down to an acceptable value, controller A and its linkages to cam 134 and the cam rise of 134 will preferably be so proportioned that an overspeed as little as 1% will cause controller A to fully close a fully open throttle.

The orifice 58 in the piston 57 represented diagrammatically in Fig. 1 is a type of orifice which gives a pressure differential substantially in proportion to the first power of the rate of flow. The simple orifice which is shown diagrammatically will give substantially the required effect when the displacement of piston 57 is relatively great. In order to obtain the desired effect for small piston displacement, the construction shown in Figs. 18 to 21 may be used. Piston 57' (Fig. 18) carries a bushing 570 having hole 571 having the least diameter at mid-section line 20—20 increasing to the greatest diameters at the sides of the bushing 570. Hole 571 receives a plug 572 which is circular in cross section at its middle portion and which is provided with "flats" 573 so that the end views of the plug are that shown in Fig. 21. The middle portion of the plugs 572 is normally located at the section line 20—20 at which the hole 571 has the smallest diameter, said diameter being slightly greater than the diameter of the middle portion of the plug as shown in Fig. 18. Plug 572 is attached to a rod 574 loosely slidable through an apertured plate 575 suporting the ends of a leaf spring 576 connected at its middle portion with the rod 574. The spring 576 resists displacement of the plug 572 in either direction from the normal position shown in Fig. 18. When the conditions causing displacement of the plug 572 from normal position cease, the spring 576 returns the plug to normal position. As the rate of flow of hydraulic fluid through the hole 571 increases, the area of the orifice at section line 20—20 between the plug 572 and the bushing 570 increases. The shape of the plug 572 is such that the difference between the pressures on opposite sides of the piston 57' will be substantially in proportion to the first power of the rate of flow through said orifice.

The simple orifice 58 of Fig. 1 or the variable orifice of Fig. 18 can be located in parallel with the piston of cylinder 56 in any manner. For example, either of these orifices may be located in a by-pass connecting the ends of cylinder 56.

The apparatus shown in Fig. 1 with the exception of the control lever 80, located in the cockpit, can be housed in a single apparatus box. The link 86 may be any suitable connection between the control lever and the cams and may be a push-pull cable located in a guide tube. In case the connections running from the control lever to the apparatus box were shot away it might be desirable to include in the connections between the throttle and the cams a non-reversing mechanism so that the cams would remain in the position last set. This mechanism may be, for example, that shown in Fig. 4. Cable or link 86 (Fig. 1) is connected with the rack 200 meshing with a gear 201 driving a gear 202 meshing with a gear 203 driving a gear 204 meshing with a gear 205. The hub of gear 205 is internally threaded to provide a nut received by a threaded shaft 206 which is connected with the cams 90, 100 and 110.

Referring to Fig. 5, the cams 90, 100 and 110 may be of the rotary type in which case they would be mounted on a shaft 210 connected with a worm wheel 211 driven by worm 212 which would be driven by the gear 205 of Fig. 4.

If the apparatus is to be used for a single engine installation, the synchronizing mechanism would be omitted, the omitted mechanism including the motor 19, the subtracting differential gears 13, 14, 15 and 18, gear 17, pinion 20, clutch 21, screw 22, nut 23, link 24, lever 25 and support 26. The shaft of pinion 28 would be supported by a fixed bracket.

For a four-engine installation there would be four apparatus boxes each associated with an engine and each individually controlled by a control lever 80 as shown in Fig. 6. All four engines would be controlled by a master control lever 220 connected with a shaft 221 upon which each of the hubs 80a of the levers 80 are journaled as shown in Fig. 7. Each lever 80 may be connected with the shaft 221 by placing the lever 80 in line with the master lever 220. When this happens, a detent ball 222 carried by the lever 80 is urged by spring 223 into a recess 224 provided by an arm 225 whose hub 226 is pinned to the shaft 221. The master lever 220, being frictionally connected with its quadrant 220' in any desired position for controlling all four engines, one of the four engines may be individually controlled by moving its throttle lever 80 when the pilot wishes to have an unsymmetrical thrust distribution on the plane for land or water maneuvering or wishes to feather the propeller on a disabled engine, etc. When any of the levers 80 are out of line with the master lever 220, such levers 80 are frictionally held against their quadrants 82 and will remain in whatever position they are located separately. Only those levers 80 which remain in line with the master lever 220 will be moved when the master lever is moved. When those levers 80 which were moved out of line with master lever 220 are returned to position in alignment with lever 220, then those levers become connected again with the shaft 221 through the spring urged balls 222 connecting the levers 80 with the arm 225. Then the master lever 220 is operative to control all the engines.

Each of the levers 80 operates a cam 230 which is shaped so as to effect a speed of the three-phase sychronous motor 19, Fig. 1, in conformity to the speed demanded by the speed setting cam 100. Each cam 230 engages a follower roller 231 supported by bracket 232; and all the brackets 232 are carried by a bar 233 urged upwardly by a spring 234 so that all of the followers 231 will tend to engage their respective cams 230. Bar 233 is connected by a link 235 with a lever 236 mounted on the crank throw 237 of a crank shaft 238 operated by lever 239 connected by link 240 in any suitable maner with all the cruise control levers 36 of the engine as represented in Fig. 1. The movements of the lever 236 effect the control of the speed controlling unit 241 which determines the speed of a direct current motor 242 which drives a three-phase generator 243 which is electrically connected with all of the three-phase synchronous motors 19. When all of the levers 80 are in line with the master lever 220, movement of the master lever 220 causes all of the cams 230 to move together as one cam and to set the speed of the master motor 242 in conformity to the speeds demanded by the speed setting cams 100. This synchronizing system is however limited in its effect, owing to the limitation placed on the movements of the lever 25, Fig. 1, by the stops 25a and 25b. Therefore when it is desired to control one or more of the four engines by moving its throttle lever 80 out of line with the master lever 220, the desired control can be effected. For example, if it is desired to have one engine operating faster than the others, the master synchronizer 243 would be controlled by the lever 80 of that engine and not by those levers 80 which remain in line with the master lever 220 since the position of the bar 233 is controlled by the follower 231 calling for the highest speed setting. Therefore, when any of the followers 231 rides on the high part of the cam 230 the high speed operation of the synchronizer is set, although another of the cams 230 may be placed in position where its low land would be adjacent its cam follower. However, although the synchronizer of a particular engine would call for a high synchronous speed, the throttle lever 80 of that engine can move the cam 230 to a position calling for a lower speed. The result would be that there would be movement of the gear 17 causing the pinion 20 to rotate, thereby causing movement of the lever 25 until it engaged one of its stops 25a or 25b. After that the screw 22 cannot rotate and the friction clutch 21 would slip while pinion 20 continues rotating. In addition to permitting operation of one plant at a different speed, the limitation of synchronizing effect permits safe operation of the power plants in the event of failure of the synchronizing system free of any serious, large, increase or decrease in speed.

The apparatus provides for throttle control and pitch control in parallel. That is, these controls act simultaneously and in a non-interfering manner. Therefore, constant speed control is assured in all flight and blade angle regimes to accuracy adequate to protect the prime-mover whether it be a reciprocating engine or a gas turbine. The customary control for a reciprocating internal combustion engine is to drop the speed substantially when the throttle is closed. Therefore the cam groove for a reciprocating engine has the portion 102' at about 50% of highest speed. For a gas turbine, the portion 102 drops to about 90% of standard or best operating speed.

The higher power levels of the throttle setting cam 90 and of the speed setting cam 100 are designed to give the proper manifold pressure (or fuel rate) for the R. P. M., or vice versa. For greater fuel economy at a given manifold pressure (or fuel rate), it may be desirable to decrease the speed setting. For this purpose the flight engineer may operate the lever 36 in a clockwise direction, thereby elevating the rod 32 in order to reduce the equilibrium speed at the same time the synchronizer master speed should be similarly reduced. This is effected by the connection between the lever 36 of Fig. 1 and the lever 239 of Fig. 6 through the link 240. Movement of the lever 36 in order to reduce equilibrium speed causes lever 239 to move counterclockwise to drop the crank 237 thereby dropping the left end of lever 236 for a slower governed speed of the master motor 242.

The throttle setting cam 90 has its low portion 92 sufficiently low so that, even with the speed setting conditioned for its lowest value by the lever 36, fuel will need to be added by the throttle actuating cam 134 to maintain the idle R. P. M. This is essential in order to keep the $\beta$ values low during idle and taxying conditions so that the $\beta$ limit cam 110 will be able at $\beta$ angles near the gate values, to control propeller blade angle directly, both in positive and negative pitch. In the lower power regions the $\beta$ limit cam 110 thus controls the follower roller 121 positively. This is desirable in this region where $$\frac{\partial Q(\text{torque})}{\partial \beta}$$

equals or nearly equals zero; that is, the ratio is too small in value for change in blade angle to effect any appreciable change in torque.

Hereinafter, the A controller (Fig. 1) refers to the piston 57 and parts connecting it with cam 134; and the B controller refers to the blade angle control servo 70 which is controlled by the governor, and whose operation may be limited by cam 110.

The transition gate of cam 110 (between surfaces 114 and 115) may give zero blade angle or a slight negative blade angle, for example, $-4°$. Surface 118, which determines the low limits of positive blade angle, extends from the gate to point 118a which determines the lowest blade angle for full power and speed under hot day, zero air speed conditions. In the positive range, surface 117 so limits upward movement of roller 121 as to limit positive blade angle to the maximum required for high speed dives at full engine speed and power, or for cruising. Surface 116 is a blocker. Roller 121 cannot be in position to be received by the gate unless air speed is low enough for the roller 121 to drop upon surface 118. Therefore shift from positive pitch to negative pitch cannot be effected unless air speed has been sufficiently reduced. Surface 111, which determines the low limits of negative blade angle, slopes from the gate to point 111a which determines the lowest negative angle at which full engine speed can be reached at the highest forward speed of the plane that negative thrust will be called for at full power. This will give an angle which is appreciably more negative than the gate in landing run and even in dive-braking applications. In the negative range, surface 112 so limits downward movement of roller 121 as to limit negative blade angle to the maximum at which full power and engine speed can be developed under static conditions.

The action of cam 110 under different air speed conditions will now be described with reference to Figs. 8 to 11.

In Figs. 8 to 11, curves $R_{90}$ and $R_A$ are plotted relative to positions of control lever 80 in positive thrust range P, transition range T and negative thrust range N. Curve $R_{90}$ represents fuel rate called for by the throttle setting cam 90; and curve $R_A$ represents fuel rate required to maintain required engine speed for the minimum blade angle specified by cam 110 at the particular air speed corresponding to the figure. In range T, between the right end G+ of the gate and the left end G— of the gate, the curves become horizontal lines.

Figs. 8–10 are for a normal application requiring braking only at landing run speeds.

Fig. 8 shows the relation of curves $R_{90}$ and $R_A$ for zero air speed. These curves cross at $x$ and $y$. To the right of $y$ and to the left of $x$, curve $R_{90}$ is above $R_A$; and the horizontally shaded portions indicate the extent to which cam 90 calls for more fuel than is required to maintain a selected speed. These ranges are marked "cam 90" because cam 90 determines the fuel rate which will give more speed than selected by cam 100, and the governor operates through controller B to increase pitch in order to maintain the selected speed. Between $x$ and $y$, curve $R_A$ is above curve $R_{90}$; and the vertically shaded portion indicated the extent to which cam 90 calls for less fuel than is required to maintain a selected speed. This range is marked "A" because cam 90 demands less fuel than required to maintain the speed selected by cam 100, and controller A operates through cam 134 to increase the fuel rate in order to maintain selected speed.

Under zero air speed conditions, surface 118 is contacted by roller 121 from the gate defined by surfaces 114, 115 to a point corresponding to point $y$ of Fig. 8 as lever 80 is moved clockwise in the positive thrust range. Surface 118 is so shaped that, during the positive portion of range A (Fig. 8), the B controller cannot reduce positive blade angle to such value that the governor will be in equilibrium status. Therefore pressure fluid will flow in the direction of arrows marked "underspeed" to cause piston 57 of the A controller to move left to effect downward movement of cam 134 to increase fuel rate in order that required speed will be maintained by fuel rate increase rather than by decrease of positive blade angle.

In the negative pitch range, piston 72 moves up to decrease negative pitch and down to increase negative pitch. Therefore surface 112 of cam 110 determines the high limit of negative pitch for various positions of lever 80 in the negative pitch range. It permits the highest negative blade angle i. e. the angle required under static conditions. Surface 111 of cam 110 determines the low limit of negative pitch for various positions of lever 80 in the negative pitch range. Under zero air speed conditions, surface 111 is contacted by roller 121 from the gate (defined by surfaces 114, 115) up to a point corresponding to point $x$ of Fig. 8, as lever 80 is moved counterclockwise in the negative thrust range. Surface 111 is so shaped that, during the negative portion of range A (Fig. 8), controller B cannot reduce negative blade angle to such value that the governor will be in equilibrium status. Therefore pressure fluid will flow in the direction of arrows marked "underspeed" (valve 64 being reversed for negative pitch control), to cause piston 57 of controller A to move left to effect downward movement of cam 134 to increase fuel rate in order that the required speed will be maintained by fuel rate increase rather than by decrease of negative blade angle.

Although cam surfaces 112 and 111 may block movements of piston 72 of controller B down and up, respectively, pressure fluid flow continues in the manner stated because, when piston 72 stops, one of the relief valves 79 opens.

Fig. 9 shows curve $R_{90}$ and curve $R_A$ for 120 M. P. H. air speed. To the left of intersecting point $z$, the A-controller is active to determine the fuel rate. To the right of point $z$, the fuel rate is determined by cam 90, the A-controller acting momentarily, only as required to stabilize the governing. As the cam 110 is moved right from 100% positive thrust position, roller 121 is above cam surface 118 until a position of cam 110 is reached corresponding to point $z$ of Fig. 9. Then roller 121 engages cam surface 118. Thereafter roller 121 follows cam surface 118 to the gate and cam surface 111 to point 111a. To the left of point $z$, the vertically shaded area shows the deficiency in the fuel rate called for by cam 90 which is made up by the operation of controller A. To the right of point $z$, the horizontally shaded area shows the excess of fuel rate demanded by cam 90 which requires the governor to increase blade angle in order to prevent exceeding the selected speed. The latter shaded area is greater than area to the right of point $y$ of Fig. 8, because less power from the engine is required, at 120 M. P. H. air speed than at zero air speed, to turn the propeller at the required R. P. M. in positive pitch.

Fig. 10 shows the relation of curves $R_{90}$ and $R_A$ for 300 M. P. H. air speed. At this air speed, $R_A$ is mostly below the zero power line, thus denoting that propeller windmills the engine. As indicated by the large horizontally shaded area, the fuel rate represented by $R_{90}$ is much in excess of that required to maintain the required engine speed. Hence the governor is demanding high positive blade angles. Roller 121, being substantially above cam surface 118 of cam 110 (Fig. 1) under these conditions, is not in position to be received by the gate (defined by surfaces 114, 115) but blocks movement of cam 110 to the right by engaging the surface 116 of cam 110. Hence the curves R90 and RA are shown by the dotted lines to the left of gate entrance denoted by line G+. Surface 116 being a blocker, air speed must be reduced to a value such that roller 121 will engage surface 118 before lever 80 can be moved into a negative thrust position, as is required if overspeeding is to be avoided.

Fig. 11 shows curves R90 and RA and R'A when the apparatus is modified for dive-braking. For dive-braking applications, grooves 91, 92 and 93 of cam 90 are changed as indicated in dot-dash lines (Fig. 1) at 91', 92' and 93' respectively. This provides such lowering of the fuel rate, in the ranges of low positive and negative thrust positions of lever 80, that there is a tendency of prime-mover speed to fall below required speed even when air speed is high, for example, 300 M. P. H. when the prime-mover is a turbine, or 200 M. P. H. when the prime-mover is a reciprocating engine. Therefore, the governor will attempt to reduce positive blade angle in the low positive thrust position of lever 80 and to reduce negative blade angle in the low negative thrust position of lever 80. Surfaces 118 will engage roller 121 and guide it into the gate and surface 111 will receive the roller 121 as the gate passes to the right from the roller. In this way, the shift from positive to negative blade angle can be made at relatively high air speed. During this transition period, the A-controller determines fuel rate in order to maintain required speed. If cam 111 were used for dive-braking applications, the A-controller would be effective, during negative thrust, to give the fuel rates indicated by dot-dash line curve RA. This curve reaches 100% power value before the lever 80 reaches full negative thrust position and further movement of lever 80 would force the power plant to drop in speed at this high forward speed. To avoid this, cam surface 111 is changed to 111'; and control according to line R'A is obtained. To the left of point $w$, when R90 crosses RA, controller A is effective to give the speed required.

Figure 12:
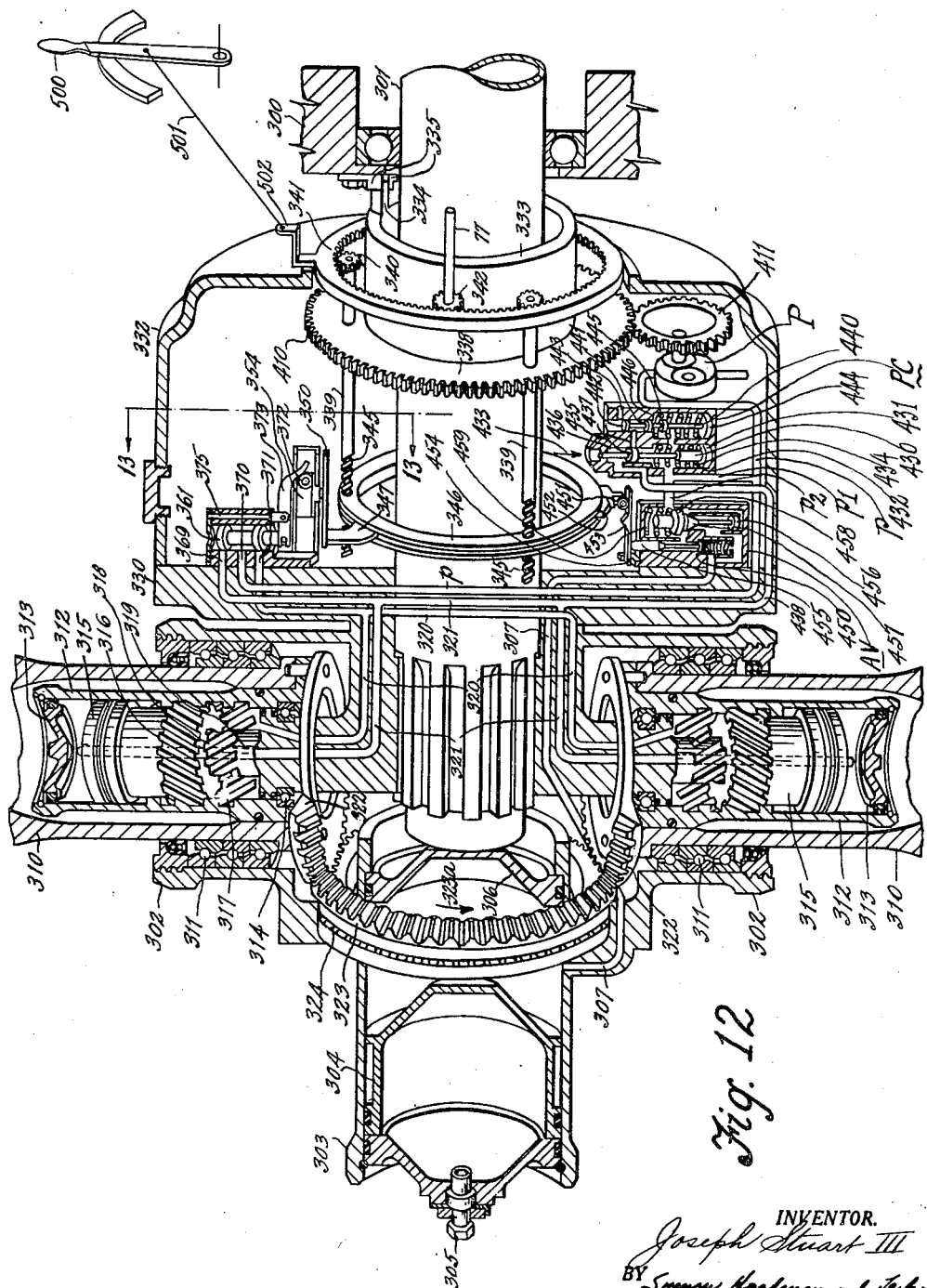
Fig. 12 is a perspective, longitudinal, sectional view of a form of propeller hub and torque unit assembly with which the present control apparatus may be used.

The controller apparatus may be used with various types of propeller hubs having a blade pitch changing unit assembled therewith, for example, the hub and torque unit assembly shown in the patents to Blanchard and MacNeil, Nos. 2,307,101 and 2,307,102, issued January 5, 1943. Fig. 12 shows somewhat diagrammatically a propeller hub and torque unit assembly of the type disclosed in these patents. From the engine frame 300 there extends an engine driven shaft 301 which supports and drives a propeller hub 302 which supports an accumulator 303 containing a piston 304 movable toward the right from the position shown under the action of compressed gas forced into the accumulator through a check valve 305. The space, between the piston 304 and the fixed wall 306 of the accumulator, receives oil under pressure which forces piston 304 toward the left further to compress the gas to the left of the piston, thereby maintaining a supply of oil under pressure for the purpose of feathering and unfeathering the propeller blades. Duct 307, through which oil flows into the accumulator, is controlled by a valve to be described.

The hub 302 supports a plurality of blades 310, each having its root journaled in bearings 311. Each blade is rotated about its root axis by separate torque unit comprising a cylinder 312 attached to a blade root and having its upper end closed by cap 313 and rotatably supported at its lower end by a bearing 314. Cylinder 312 cooperates with a piston 315 having external helical splines 316 cooperating with internal helical splines 317 of the cylinder 312 and having internal helical splines cooperating with external helical splines 318 of a relatively fixed member 319 supported by the hub 302. Pipes 320 and 321 lead respectively to the inner and outer ends of the cylinders 312 and are connected in a manner to be described with a distributing valve. The spiral splines are so constructed that inward movement of the piston 315 effects rotation of the cylinders 312 (clockwise looking outwardly) for the pitch increasing function; and outward movement of the pistons 315 effects rotation of the cylinders 312 in opposite direction for the pitch decreasing function. The cylinders 312 are each connected with a bevel gear segment 322, each meshing with a master gear 323 supported by a bearing 324 carried by the hub 302, thereby equalizing the pitch changing movements of the blades.

The hub 302 supports a plate 330 which, as shown in Fig. 14, is secured by tubular nut 331. The plate 330 and its cover 332 (Fig. 12) provides a reservoir for hydraulic fluid. The engine shaft 301 is surrounded by a non-rotatable tube 333 concentric with the shaft and with the nut 331 (Fig. 14). Tube 333 is provided with a tang 334 (Fig. 12) received by a notch between brackets 335 attached to engine frame 300. The plate 330 and its cover 332 provide bearings which maintain the concentricity of the tube 333, one of these bearings being shown at 336 in (Fig. 14.) Each bearing has a seal such as 337. Tube 333 provides an annular flange 338 which supports a plurality of shafts 339 each driven by a pinion 340 meshing with a ring gear 341 rotatably supported in any suitable manner by the sleeve 333. Ring gear 341 is operated by shaft 77 (Fig. 1) through any suitable mechanism such as a pinion 342 driven by shaft 77 and meshing with the gear.

Obviously, rotation of shaft 77 by controller B effects rotary movements of shafts 339 for the purpose of obtaining blade pitch change. Each shaft 339 provides a screw 345 threaded into a grooved ring 346 slidably along the tube 333. Ring 346 receives a shoe 347 (Fig. 13) attached to a rod 348 guided for movement parallel to the shaft 301 by the plate 330. Shoe 347 connected by screw 349 with a bar 350 having a slot 351 which receives a shoe 352 provided by a pin 353 which swivels in a carriage 354 supported by rollers 355 slidable in ways provided by channel brackets 356 attached by screws 357 to a valve body 358 attached by screws 359 to the plate 330. The valve body 358 is part of a distributing valve unit 360 comprising a valve 361 slidable in a valve sleeve 362 having ports 363, 365 and 367 connected by annular grooves 364, 366 and 368 respectively with holes 369, 370 and 371 respectively. Hole 370 is connected in a manner to be described with a pressure pump. Hole 369 is connected with passages 321 and hole 371 is connected with passages 320. The position of valve 361 is determined by the position of carriage 354 which carries a roller 372 engageable with a lever 373 pivotally supported by pin 374 carried by a screw 375 attached to the valve body 358. Lever 373 is provided with a notch 376 receiving a pin 377 attached to the valve 361. Since centrifugal force acts upon the valve 361 as indicated by arrow 361a, Fig. 14, the lever 373 remains in engagement with the roller 372 while the propeller hub is rotated. Hence, no spring is required to hold the lever 373 against het roller 372. When piston 72 of the controller B of Fig. 1 moves up to demand pitch increase, shaft 77 rotates counterclockwise as viewed from the right in Figs. 1 and 12. Hence, the gear 341, the pinions 340, the shafts 339 rotate in the same direction thereby causing the grooved ring 346 to move toward the left, thereby moving the carriage 354 toward the left. As roller 372 moves toward the left centrifugal force causes the valve 361 to move upwardly thereby connecting holes 370 and 369 which causes pressure fluid to flow through pipes 321 in order to force the piston 315 inwardly whereby blade pitch is increased. While the blades 310 are being rotated about their root axes in the direction of pitch increases, the valve 361 is being returned to a balanced position closing ports 363 and 367 at which position the valve arrives when the demand for pitch increase has been satisfied. In order to accomplish this, the master bevel gear 323 is connected with a gear 380 (Fig. 16) which is retained by a plate 381 attached to the hub 302 and which meshes with a gear 382 pivotally supported by a screw 383 attached to a plate 384 supported by hub 302. Gear 382 meshes with gear 385 attached to a shaft 386 having a bearing and a boss 387 integral with the plate 384. Shaft 386 is connected with a coupling disc 388 connected by a screw 389 with a coupling disc 390 attached to a shaft 391 journaled in a bearing 392 carried by the plate 330 and retained by a nut 393 threaded on the bearing 392 as shown in Fig. 16. Shaft 391 is provided with a helical groove 395 which receives a ball 396 carried by a member 397 which serves as a nut and travels along the helical or screw-threaded groove 395. Nut 397 provides a stud 398 passing through a slot 399 in bar 350 and retained by a nut 400. The back lash in the gears 382 and 385 is taken up by spring 401 having one end received by a notch 402 in the boss 387 and the other end received by notch 403 in the hub of the coupling disc 388. The spring 401 is initially wound up in order to spring-load the gears 380, 382 and 385. Coupling screw 389 passes through an elongated arcuate hole 390a in the disc 390, thereby providing for angular adjustment between the coupling disc 388 and 390.

When carriage 354 is in the position shown in Fig. 14 and in full section lines (Fig. 15), the valve 361 is in neutral position blocking ports 363 and 367 so that the torque units will not operate. One set of conditions which places valve 361 in neutral position, is that which exists when screw 349 and stud 398 are located as shown in Fig. 15. These are the conditions for minimum positive or maximum negative pitch. To decrease the pitch negatively and increase pitch positively, the piston 72 of controller B (Fig. 1) is caused to move up thereby causing ring 346 and carriage 354 to move left from the position shown in Fig. 14. The demand for pitch increase, positively, may be such as to place screw 349 in position 349' and bar 350 in position 350' and carriage 354 in position 354' (Fig. 15). This will effect blade angle increase, positively, in the manner described. During blade angle increase, the master gear 323 rotates counterclockwise as indicated by arrow 323a in Fig. 12 or clockwise in Fig. 17 as indicated by arrow 323b. Therefore the shaft 386 will rotate clockwise in Fig. 17, thereby causing the screw 395 to rotate counterclockwise as indicated by arrow 395a when viewed from the direction of arrow 395b (Fig. 16). Therefore, while the blades are being rotated to increase pitch, the nut 397 will be moving down in Figs. 15 and 16 thereby carrying the stud 398 to the position 398' which causes the carriage 354 to be brought back into position shown in full lines in Fig. 15 thereby returning the valve 361 in balanced position. If the movement of ring 346 had been such as to cause the screw 349 to move to 349'', the carriage 354 would have been moved further than 354' thereby demanding a greater blade angle change which would cause the stud 398 to move to 398'' before the valve 360 is returned to balanced position. It is therefore apparent that for every position of the ring 346, there is a definite blade angle. Consequently, there is a definite blade angle position for every position of the piston 72 of the controller B of Fig. 1. The mechanism shown provides for adjustment of blade angle in a range of approximately 120°.

The flange 338 of sleeve 333 (Fig. 12) provides a stationary gear 410 meshing with a gear 411 which drives a pump P while the propeller hub is rotating. The outlet of pipe p of pump P is connected with the passage 370 of the distributing valve 360. Pipe p is connected by pipe $p_1$ with a pressure control unit PC connected by pipe $p_2$ with an accumulator control valve unit AV. The pressure control unit PC comprises a valve rod 430 having a dashpot head 431 received by a cylinder 432 connected with pipe $p_1$. Rod 430 is urged outwardly by centrifugal force acting in the direction of arrow 433 and by spring 434 in opposition to fluid pressure acting upon the lower (in Fig. 12) surface of a piston valve 435 received by a cylinder 436 and controlling a relief port 437. The inner end of cylinder 436 is connected by pipe 438 with pipe 321. Valve 435, being responsive to centrifugal force, causes the pressure in line p to increase as speed increases and this pressure is increased also when cylinder 436 receives pressure from the pipe 321 which is under pressure when there is a demand for pitch increase.

The unit PC includes also a minimum pressure control valve provided by a rod 440 having lands 441 and 442 for controlling the connection between port 437 and a discharge port 443. The rod 440 has a dashpot head 444 engaged by a spring 445 located in a cylinder 446 connected with cylinder 432. The force of spring 445 is opposed by the fluid pressure acting upon the under (in Fig. 12) side of valve land 441. The pressure available in pipe p will be limited to a minimum value by movement of rod 440 to a position for connecting the ports 437 and 443, valve 435 having opened port 437. Up to a certain rotative speed of the hub, the pressure is limited to a minimum value in order that the accumulator will be fully charged within a short time even while the engine is operating at low speed. This minimum pressure is sufficient for the pitch-decreasing function of the torque units. As propeller speed increases, valve 435, being under control by centrifugal force, requires greater line pressure to cause the opening of the port 437. Therefore the pressure increases in pipe p above the minimum in order to make available the pressures required for the pitch-increasing function which requires greater pressure with increase of speed.

While rod 440 of unit PC is shown parallel with rod 430 which is under the action of centrifugal force, it will be understood that rod 440 is not controlled by centrifugal force but is actually located at right angles to rod 430. The units PC and AV are fully described in the copending application of David A. Richardson, Serial No. 613,563, filed August 30, 1945, now U. S. Patent 2,612,958.

For the understanding of the present invention, it is sufficient to state that the accumulator control valve unit AV has a check valve 450 which normally blocks flow from the accumulator 303 to pipe $p_1$. When feathering is required, ring 346 is moved to the extreme left to cause a roller 451 (carried by a shoe 452 received in the groove of ring 346) to engage cam 453 on a lever 454 and to effect outward movement of said lever and of a rod 455 thereby opening the check valve 450. Pressure oil then flows from the accumulator to underside (in Fig. 12) of a piston 456 thereby effecting the opening of a valve 457 so that the accumulator may discharge to pipe $p_1$ through a by-pass around the check valve. During this discharge the valve 457 is held open by oil pressure against the underside (in Fig. 12) of a piston 458. As feathering is completed, the pressure differential between the pressure in pipe $p_1$ and the pressure against the underside of piston 458 decreases and spring 459 closes valve 457. Cam 453 having been momentarily contacted by roller 451 during movement of ring 346 to the extreme left, check valve recloses. Therefore discharge of the accumulator is prevented until it is desired to use accumulator pressure to assist in the unfeathering operation. This is effected by right (in Fig. 12) movement of ring 346 which effects momentary opening of check valve 450; and discharge of the accumulator into pipes $p_1$ and p takes place.

The pilot may over-ride the B-controller (Fig. 1) by operating lever 500 (Fig. 12) connected by link 501 with arm 502 provided by ring gear 341.

Summary

The apparatus for governing the speed of the prime-mover has inherent stability because it includes instruments which are respectively sensitive to $\phi$ (displacement or integrated speed error) and to $\dot{\phi}$ (rate of displacement or speed error). The instrument sensitive to $\phi$ adjusts the torque absorbing ability of the work-device (propeller) operated by the prime-mover. The instrument sensitive to $\dot{\phi}$ adjusts the medium (fuel) which causes operation of the prime-mover. Both instruments operate jointly during the normal operating range of the prime-mover to effect a stable governing action.

In the application of the governing apparatus to a prime-mover-propeller power-plant, the instrument sensitive to $\phi$ operates to change blade-pitch in proportion to $\phi$ and at a rate proportional to $\dot{\phi}$, amount of speed error. The instrument sensitive to $\dot{\phi}$ operates to effect a deviation of fuel rate from normal (as set by cam 90). Hence the rate of deviation of fuel rate from normal is proportional to $\dot{\phi}$ or rate of change of speed error. For example, if the prime-mover starts to overspeed, blade angle starts to increase at a rate proportional to the amount of speed error. This increase is accompanied by a decrease of fuel rate, from the rate set by cam 90, at a rate which is proportional to the rate of change of speed. The decrease in fuel rate has the effect of lowering the maximum of the speed error at which instant the blade-angle is being increased at the maximum rate. As speed error falls, the rate of blade-angle increase diminishes and the fuel rate is caused to increase to the normal rate set by cam 90. The rate of fuel-rate increase toward normal is proportional to the rate of decrease of speed error toward the governed speed set by cam 100. By the time blade-angle has been increased to give zero speed error, the deviation of fuel-rate from normal will be zero in the case of the use of a degree of stabilization equal to or greater than the critical amount. There is a temporary modification of fuel-rate for the purpose of securing stability; but the fuel-rate returns to normal when that purpose has been accomplished.

Errors have been substantially eliminated because there is a common zero for the $\phi$-sensitive instrument B and the $\dot{\phi}$-sensitive instrument A; and there is a common operating medium for these instruments. The common zero is established by the speed controlled valve (parts 45, 46 and 47); and the common operating medium is the pressure fluid which actuates instruments A and B when this valve responds to speed error.

The speed responsive governor valve controls rate of fluid flow in proportion to the amount of off-speed. Hence the apparatus provides an hydraulic flow proportionalizing governor. It feeds pressure fluid to the servomotor, instrument B, the displacement of whose piston is a measure of $\phi$. It feeds pressure fluid to the orifice 58 of the piston of instrument B. The pressure differential across the orifice 58 furnishes a measure of $\dot{\phi}$. This orifice 58 and the linkage system to cam 134 is so proportioned as to give the desired degree of stabilizing action to the complete system. The degree of stabilization may be the critical amount in which case there would be only one oscillation of speed error from zero to maximum and return to zero. Usually the practice is to use a degree of stabilization less than critical since equilibrium is substantially established in less time than with the critical amount altho there would be a few additional slight oscillations of speed error before return to zero.

The governing system is well-adapted for use with a prime-mover having relatively high effective inertia such as the internal-combustion turbine which is desirably operated at high R. P. M. throughout the full operating range. The necessary governing action is effected without requiring blade angle change to be made at impractically high rates because the temporary fuel-rate modification helps to maintain the maximum speed error within safe limits while blade angle is being changed at a practical rate.

The apparatus provides means for controlling the engine-propeller power plant to effect the desired engine speed and power during all positive and negative thrust operating conditions. This means is under control by a single main control lever which operates in a desired range of negative thrust and in a desired range of positive thrust including feathering. The control means provides for direct manual control of blade angle during relatively low blade angle conditions when $$\frac{\partial Q}{\partial \beta}$$

is practically zero. Blade angle can be set manually by the main control lever to the proper value for starting the prime mover.

The apparatus provides a manually operated, continuously variable control from highest negative thrust to highest positive thrust. By means of a single control lever, fuel-rates and engine speeds are selected according to a predetermined schedule of positions of the lever in the positive and negative thrust ranges and values of fuel-rate and engine-speed. In normal forward flight the control is effective according to the schedule determined by cams 90 and 100 and the selected speed is governed by automatic change in blade angle by instrument B accompanied by the stabilization effected by instrument A. At relatively low blade angles, particularly under static conditions, speed is approximately determined by cam 100, while blade angles are determined by the manual setting of cams 118 or 111. Under these conditions, blade-pitch cannot be reduced, positively or negatively, to such value as to actually maintain the speed called for by cam 100, in consequence of which instrument A is caused to function to increase the fuel-rate above that scheduled by cam 90 in order to maintain a necessary speed altho slightly less than called for by cam 100.

Unless manual control of blade angle is effective, movement of cam plate 110, and, therefore, lever 80 cannot be moved from the positive thrust range to the negative thrust range; and, therefore, the transition from positive thrust to negative thrust cannot be made under high air-speed conditions excepting in case the control is modified for dive-braking as explained with reference to Fig. 11.

The cam plate 110 provides for manual control of blade angle for feathering.

The apparatus provides for modification, in a limited range, of the speed setting by cam 100 by means controlled by a synchronizer. Therefore, in case of a multi-engine application, minor adjustments of speed of each engine can be made by the synchronizer. Synchronization is effectable throughout the positive and negative pitch range of each engine.

In the case of a multi-engine application, each lever 80 operating the control apparatus of each engine controls the synchronizer in conformity to the control of speed by cam 100. All of the levers 80 may be controlled by a master lever 220; but each lever 80 may be independently operated to obtain a speed outside the range of the synchronizer for land or water taxying purposes.

For cruising purposes, the apparatus of each engine provides for modification of the speed setting by cam 100 by a lever 36. In the case of a multi-engine application, all of the levers 36 are operated by a single lever C which also controls the synchronizer in order to reduce synchronizer speed for crusing purposes.

While the embodiments of the present invention as herein disclosed, constitutes a preferred form, it is to be understood that other forms might be adopted, all coming within the scope of the claims which follow.

What is claimed is as follows:

1. A control system for a prime-mover propeller power plant comprising, propeller blade angle changing mechanism including a source of fluid pressure; a valve connected with said source; a servo motor having a cylinder connected with said valve, a reciprocable piston disposed in said cylinder and dividing it into two chambers and a pair of relief valves interconnecting said chambers for permitting flow from either chamber to the other chamber when the piston is restrained against movement, a speed responsive governor driven by the prime-mover, said governor having operative connection with said valve for controlling the operation of said blade angle changing mechanism to maintain power plant speed equal to the speed for which said governor is set, and manually operable mechanical means connected with the piston for restraining movement of said piston due to a pressure differential thereacross in the relatively low blade angle range so as to control blade angle independently of the governor operated valve.

2. A control system for a prime-mover propeller power-plant comprising, propeller blade angle changing mechanism including a source of fluid pressure, a valve connected with said source, a servo motor having a cylinder connected with said valve, a reciprocable piston disposed in said cylinder and dividing said cylinder into two chambers and a pair of relief valves interconnecting said chambers for permitting flow from either chamber to the other chamber when said piston is restrained against movement, a speed responsive governor driven by the prime-mover, said governor having operative connection with said valve for controlling the operation of said blade angle changing mechanism to maintain power-plant speed equal to the speed for which said governor is set, means for adjusting the governor for various governed speeds, and manually operable mechanical means connected with the piston for restraining movement of said piston due to a pressure differential thereacross in the relatively low blade angle range so as to control blade angle independently of the governor operated valve.

3. A control system for a prime-mover propeller power-plant comprising, propeller blade angle changing mechanism including a source of fluid pressure, a valve connected with said source, a servo motor having a cylinder connected with said valve, a reciprocable piston disposed in said cylinder and dividing said cylinder into two chambers and a pair of relief valves interconnecting said chambers for permitting flow from either chamber to the other chamber when said piston is restrained against movement, a rod connected to said piston and extending through an end wall of said cylinder, a speed responsive governor driven by the prime-mover, said governor having operative connection with said valve for controlling the operation of said blade angle changing mechanism to maintain power plant speed equal to the speed for which said governor is set, and manually operable means engageable with said rod for restraining movement of said piston in the relatively low blade angle range so as to control blade angle independently of the governor operated valve.

4. A control system for a prime-mover propeller power-plant comprising, propeller blade angle changing mechanism including a source of fluid pressure, a valve connected with said source, a servo motor having a cylinder connected with said valve, a reciprocable piston disposed in said cylinder and dividing said cylinder into two chambers and a pair of relief valves interconnecting said chambers for permitting flow from either chamber to the other chamber when said piston is restrained against movement, a rod connected to said piston and extending through an end wall of said cylinder, a cam follower carried by said rod, a speed responsive governor driven by the prime-mover, said governor having operative connection with said valve for controlling the opeartion of said blade angle changing mechanism to maintain power-plant speed equal to the speed for which said governor is set, and a manually positionable cam engageable with said cam follower for restraining movement of said piston in the relatively low blade angle range so as to control blade angle independently of the governor operated valve.

5. A control system for a prime-mover propeller power-plant comprising, propeller blade angle changing mechanism including a source of fluid pressure, a control valve having a supply port connected with said source and a pair of control ports, a conduit connected with each control port, a reversing valve having a pair of inlet ports connected with said conduits and a pair of outlet ports, a servo motor having a cylinder, a reciprocable piston disposed in said cylinder and dividing said cylinder into two chambers, a pair of conduits connecting the outlet ports of said reversing valve with said cylinder chambers and a pair of relief valves interconnecting said chambers for permitting flow from either chamber to the other chamber when said piston is restrained against movement, a speed responsive governor driven by the prime-mover, said governor having operative connection with said control valve for controlling the operation of said blade angle changing mechanism to maintain a power-plant speed equal to the speed for which said governor is set, and manually operable means for actuating said reversing valve and for restraining movement of said piston in the relatively low blade angle range so as to control blade angle independently of the governor operated control valve.

6. A control system for a prime-mover propeller power-plant comprising, propeller blade angle changing mechanism including a source of fluid pressure, a control valve having a supply port connected with said source and a pair of control ports, a conduit connected with each control port, a reversing valve having a pair of inlet ports connected with said conduits and a pair of outlet ports, a servo motor having a cylinder, a reciprocable piston disposed in said cylinder and dividing said cylinder into two chambers, a pair of conduits connecting the outlet ports of said reversing valve with said cylinder chambers and a pair of relief valves interconnecting said chambers for permitting flow from either chamber to the other chamber when said piston is restrained against movement, a speed responsive governor driven by the prime-mover, said governor having operative connection with said control valve for controlling the operation of said blade angle changing mechanism to maintain power-plant speed equal to the speed for which said governor is set, means for adjusting the governor for various governed speeds, and manually operable means for actuating said reversing valve and for restraining movement of said piston in the relatively low blade angle range so as to control blade angle independently of the governor operated control valve.

7. A control system for a prime-mover propeller power-plant comprising, propeller blade angle changing mechanism including a source of fluid pressure, a control valve having a supply port connected with said source and a pair of control ports, a conduit connected with each control port, a reversing valve having a pair of inlet ports connected with said conduits and a pair of outlet ports, a servo motor having a cylinder, a reciprocable piston disposed in said cylinder and dividing said cylinder into two chambers, a pair of conduits connecting the outlet ports of said reversing valve with said cylinder chambers and a pair of relief valves interconnecting said chambers for permitting flow from either chamber to the other chamber when said piston is restrained against movement, a rod connected to said piston and extending through an end wall of said cylinder, a speed responsive governor driven by the prime-mover, said governor having operative connection with said control valve for controlling the operation of said blade angle changing mechanism to maintain power plant speed equal to the speed for which said governor is set, and manually operable means for actuating said reversing valve and simultaneously engageable with said rod for restraining movement of said piston in the relatively low blade angle range so as to control blade angle independently of the governor operated control valve.

8. A control system for a prime-mover propeller power-plant comprising, propeller blade angle changing mechanism including a source of fluid pressure, a control valve having a supply port connected with said source and a pair of control ports, a conduit connected with each control port, a reversing valve having a pair of inlet ports connected with said conduits and a pair of outlet ports, a servo motor having a cylinder, a reciprocable piston disposed in said cylinder and dividing said cylinder into two chambers, a pair of conduits connecting the outlet ports of said reversing valve with said cylinder chambers and a pair of relief valves interconnecting said chambers for permitting flow from either chamber to the other chamber when said piston is restrained against movement, a rod connected to said piston and extending through an end wall of said cylinder, a cam follower carried by said rod, a speed responsive governor driven by the prime-mover, said governor having operative connection with said control valve for controlling the operation of said blade angle changing mechanism to maintain power plant speed equal to the speed for which said governor is set, a manually positionable cam engageable with said cam follower for restraining movement of said piston, and means interconnecting said cam and said reversing valve for actuating said reversing valve when a predetermined portion of said cam engages said cam follower so as to control blade angle independently of the governor operated control valve in the relatively low blade angle range.

References Cited in the file of this patent

UNITED STATES PATENTS

| | | |
|---|---|---|
| Re. 20,283 | Caldwell | Mar. 9, 1937 |
| 2,217,364 | Halford et al. | Oct. 8, 1940 |